United States Patent [19]
Brandenstein et al.

[11] Patent Number: 4,764,157
[45] Date of Patent: Aug. 16, 1988

[54] TENSIONING DEVICE FOR DRIVE BELT ASSEMBLIES

[75] Inventors: Manfred Brandenstein, Eussenheim; Ludwig Edelmann, Sulzthal; Wolfgang Friedrich, Schweinfurt; Roland Haas, Hofheim; Gerhard Herrmann, Schweinfurt; Rudiger Hans, Niederwerrn, all of Fed. Rep. of Germany

[73] Assignee: SKF GmbH, Schweinfurt, Fed. Rep. of Germany

[21] Appl. No.: 36,349

[22] Filed: Apr. 9, 1987

[30] Foreign Application Priority Data
Apr. 10, 1986 [DE] Fed. Rep. of Germany ....... 3612064

[51] Int. Cl.⁴ .............................................. F16H 7/12
[52] U.S. Cl. ..................................... 474/135; 474/111
[58] Field of Search ............... 474/133, 135, 109, 111, 474/117, 101

[56] References Cited
U.S. PATENT DOCUMENTS
4,573,952 3/1986 Schulze .......................... 474/133 X FOREIGN PATENT DOCUMENTS
2181814 4/1987 United Kingdom ................ 474/135

Primary Examiner—Thuy M. Bui
Attorney, Agent, or Firm—Eugene E. Renz, Jr.

[57] ABSTRACT

A tensioning mechanism for drive belts which consists of a support arm, a rotating tensioning roll mounted on the arm, and a pivot bearing on the support arm a certain distance away from the tensioning roll. The tensioning mechanism is attached together with a mounting plate by a fastener to a machine block. A spring urges the tensioning roll away from the mounting plate and toward the drive belt. In the area of the pivot bearing, the mounting plate has, in the axial direction of the bearing, a fork-shaped cross section with shank sections which support the pivot bearing on both sides, radially and axially, by way of the fastener.

9 Claims, 2 Drawing Sheets

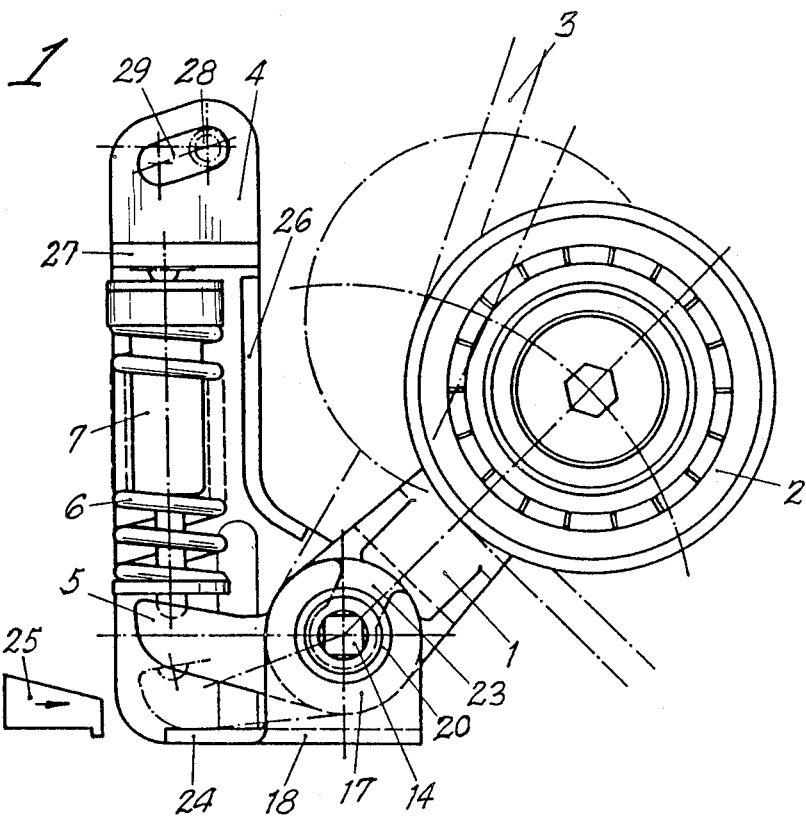
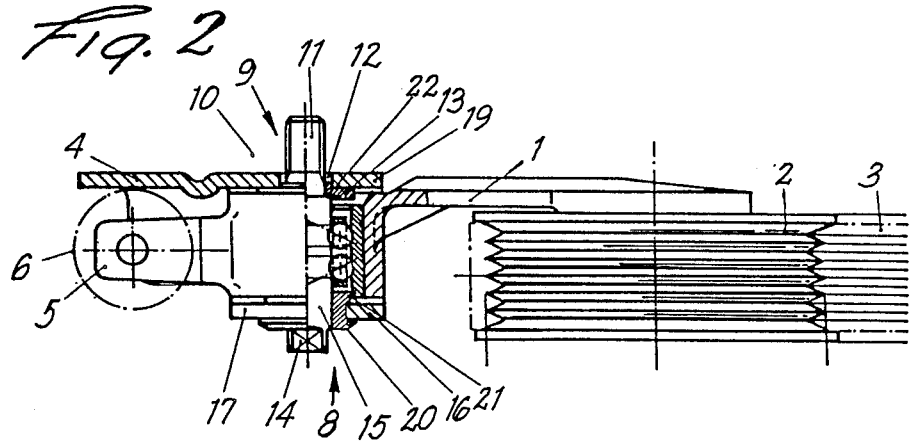

TENSIONING DEVICE FOR DRIVE BELT ASSEMBLIES

FIELD OF THE INVENTION

The present invention relates to improvements in tensioning devices for drive belt assemblies.

BACKGROUND OF THE INVENTION

Tensioning devices of the type to which the present invention relate are not new per se. German patent application No. P 3,536,834 discloses a tensioning device including a support arm designed as a lever which mounts a tensioning roll at one end and at its opposite end is attached by way of a pivot bearing to a machine block. A mounting plate is disposed between the machine block and pivot bearing and secured by a common fastener screw. A linear-action spring/damper mechanism is supported on the mounting plate or in the installed state on the machine block by an additional screw fastener. The spring/damper mechanism urges the tensioning roll against the drive belt via the support arm. The damper functions to damp oscillations of the drive belt or impact loads acting on the tensioning roll. The tensioning device consists, before assembly, of essentially three individual components; the mounting plate, the support arm with tensioning roll and the spring/damper mechanism which, in the uninstalled state, is quite elongated since the spring is fully relaxed. When the components are assembled, the spring/damper mechanism first must be tensioned and installed in this state together with the other components. This installation procedure is rather tedious and time-consuming and thus, it would be desirable to have a pre-mounted unit. In that case, however, the strength of the spring causes the components to be skewed with respect to each other. Further, it has been observed that particularly in the area of the pivot bearing, the fastener screw, which is merely inserted through the attachment hole in the mounting plate, provides an extremely unstable joint since the parts are held together merely by the slant of the screw. The components are disposed in their functional positions only after installation and only then can they operate satisfactorily.

SUMMARY OF THE INVENTION

With the foregoing in mind, it is an object of the present invention to provide a tensioning device for drive belts of the general type described above characterized by novel features of construction and arrangement wherein the parts comprise a pre-mounted unit even before installation which are properly aligned and disposed relative to one another and occupy their correct functional; positions. To this end, the mounting plate is of a forked-shaped cross section as viewed in the axial plane of the pivot bearing having shank segments which support the pivot bearing radially and axially on both sides by way of the fastening bolt. By this arrangement, the pivot bearing and accordingly, the support arm including the tensioning roll are properly positioned with respect to the mounting plate in accordance with their operational functions before and during assembly. This relationship and positioning is not disturbed even by the spring/damper mechanism thereby ensuring faster and more convenient installation. The pivot bearing is connected in a form-locking manner both axially and radially to the mounting plate thereby obviating the need for its own means of attachment.

The pivot bearing which is located between the shank sections is limited in its axial movement by the shanks and held radially in place by the fastening bolt which is inserted during pre-assembly through holes in the shank sections and through the bore of the pivot bearing. Pre-assembly is thus carried out with the spring under tension. After this tension has been released, the fastening bolt is held in its place in a force locking manner. It is noted, however, that during installation, it can be turned with sufficient ease to attach the pivot bearing together with the mounting plate to the machine block. By this assembly procedure, the pivot bearing is mounted directly on the machine block and thus, the tensioning roll retains its operating position consistently regardless of impacts and vibrations. In the installed state, the mounting plate has the sole function of supporting the spring and damping element and holding them in place with respect to the machine block.

In accordance with other features of the invention, the shank section which faces away from the mounting plate is guided exclusively in the radial direction on the fastening bolt by a receiving bore. The actual fastening of the mounting plate is accomplished by means of clamping the shank section between the pivot bearing and the machine block. The other shank section in this design simply forms the radial retainer for the fastening bolt prior to installation in the manner described above, and therefore, if the receiving bore is properly dimensioned, it also forms a radial guide with axial freedom in the installed state as well. This mounting arrangement provides additional protection against twisting of the mounting plate. The advantage of this design is that the open distance between the shank sections does not have to be adjusted precisely to the axial length of the pivot bearing and when the fastening bolt is tightened in the usual manner, the tightening movement is exclusively a measure of the fastening force and is not falsified by restraining moments of the shank projections with respect to each other.

Another feature of the present invention resides in forming the inner raceways for the pivot bearing integrally with the fastening bolt. The shank section has a continuous radial insertion slot for the fastening bolt which extends from the receiving bore and which originates at the receiving bore and extends essentially in a direction opposite to the tensioning direction of the spring. The receiving bore has a diameter larger than that of the fastening bolt and an axially self-retaining guide ring is inserted in the annular intermediate space. The pivot bearing is preferably a roller bearing which normally requires a generous amount of space in the radial direction. To maintain the space as small as possible, the races in accordance with the present invention are machined directly into the lateral surface of the fastening bolt. By this configuration, the assembly procedure described above must be modified since the fastening bolt can no longer be passed axially through the receiving bores. The shank section modified to include the raceway feature, however, makes it possible to insert the pivot bearing radially. To this end, first the threaded section pointing in the direction of the machine block is inserted through the corresponding receiving bore on one side. Thereafter, the pivot bearing is tilted sharply with respect to a line along which the two receiving bores are aligned. Thus, as insertion continues, the fastening bolt passes through the insertion slot and into the corresponding receiving bore by continued pivoting so that the axis line of the pivot bearing comes closer and closer to the lining up of the receiving bores. When the pivot bearing inserted in this way has arrived in its operating position, an annular intermediate space is formed between the fastening bolt and the surface of the receiving bore. This is filled by a ring made, for example of plastic and snap elements or the like which hold it in place. The ring can be designed as a sealing cap to cover the contact surfaces or the like required for tightening the fastening bolt.

BRIEF DESCRIPTION OF THE DRAWINGS

These and other objects of the present invention and the various features and details of the operation and construction thereof are hereinafter more fully set forth with reference to the accompanying drawigs, wherein:

FIG. 1 is a top plan view of a tensioning device having a spring/damper mechanism and a system for holding the pivot bearing on both sides;

FIG. 2 is a partial longitudinal section through the tensioning device shown in FIG. 1;

DETAILED DESCRIPTION OF THE PREFERRED EMBODIMENT

Figure 3:
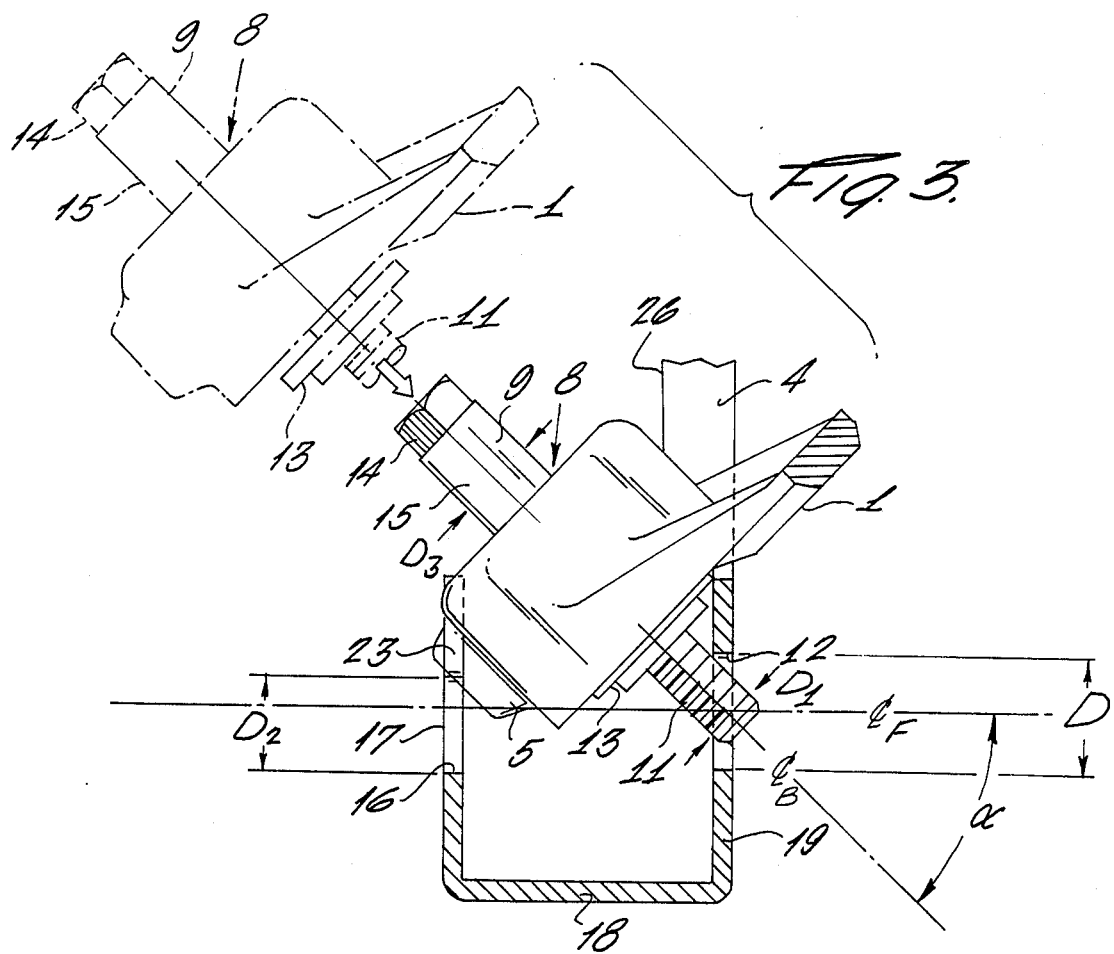
FIG. 3 is an enlarged view partly in section showing assembly of the tension device of the present invention.
Figure 4:
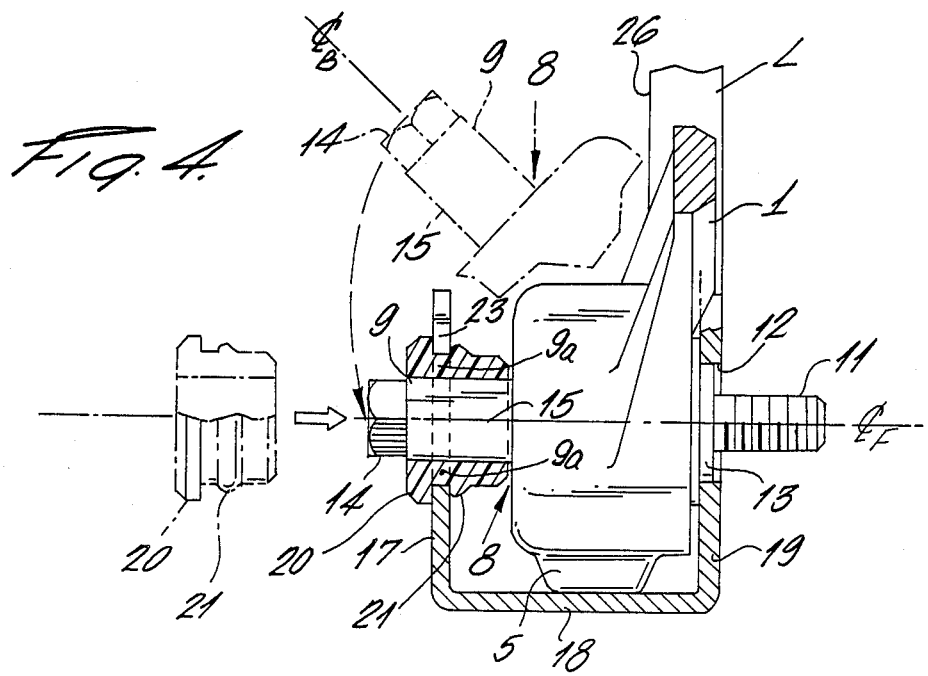
FIG. 4 is an enlarged view showing the parts illustrated in FIG. 3 in final assembly position.

Referring now to the drawings, the tensioning device illustrated comprises an elongated support arm 1 mounting a rotatable tensioning roll 2 for a drive belt 3 at one end, a mounting plate 4 which supports a spring 6 circumscribing a coaxial damping element 7, the spring being braced against the other end 5 of the support arm 1. The support arm 1 is pivotally mounted on the mounting plate 4 by means of a two-row ball bearing 8 so that is has pivoting capability between the limit positions shown in FIG. 1. The solid line position corresponds to the operating position with a tension drive belt 3 wherein the spring 6 is under relatively high tension in this instance and is, therefore, under greater pressure. The broken line position corresponds to a rest position of the tensioning device before installation or during transport wherein spring 6 is not released but assumes a limited extreme position. This rest position also corresponds to the end of the possible pivoting range. The mounting arrangement for ball bearing 8 is best illustrated in FIG. 2. As shown, ball bearing 8 is inserted with its outer ring in support arm 1 and includes a fastening bolt 9 which supports the inner races and extends axially beyond the ball bearing 8 at both axial ends. One end of the fastening bolt confronting machine block 10 passes through a receiving bore 12 in mounting plate 4. The bore 12 has a diameter D larger than the diameter $D_1$ of the threaded section 11. The bolt is threaded into machine block 10 by its threaded section 11. The annular intermediate space is filled by a flange ring 13 which effects a centering action. On the opposite side of the ball bearing 8, that is the side facing away from machine block 10, the fastening bolt 9 terminates in a square end 14 defining contact surfaces for turning the bolt by a conventional tightening tool (not shown). As illustrated, the head end 15 passes through a receiving bore 16 in a shank section 17 which is integrally connected by way of an axial bridge section 18 to mounting plate 4. Shank section 17 together with a second shank section 19 lying in the plane of mounting plate on the other side of ball bearing 8 forms a U-shaped profile bent in the axial direction from mounting plate 4. Receiving bore 16 has a larger diameter $D_2$ than diameter $D_3$ of head 15 of fastening bolt 9. The annular intermediate space 9a thus formed is filled with a plastic ring 20 which includes snapping finger elements 21 to hold it automatically in place in the axial direction. By this arrangement, ball bearing 8 is guided radially on both sides by means of fastening bolt 9. Since mounting plate 4 is attached by screws to machine block 10, it is clamped between the block and a flange surface 22 of fastening bolt 9 with an intermediate flange ring 13. Ball bearing 8 is thus attached directly to machine block 10.

The tensioning device illustrated is designed as a pre-mounted unit. In the assembly process, flange ring 13 is pushed into place on support arm 1 carrying ball bearing 8 and threaded section 11 is first introduced at an angle past shank sections 17 into the corresponding receiving bore 12 in the plane of mounting plate 4. It is possible to insert the threaded portion at an angle since the diameter of the receiving bore is larger between the two shank sections 17, 19. The square end 14 of fastening bolt 9 which emerges from the other side is guided into receiving bore 16 by pivoting it radially through a slot 23 in associated shank section 17. As this happens, threaded section 11 centers itself in the other receiving bore 12 by way of flange ring 13. Thereafter plastic ring 20 is pressed in which centers head 15 of fastening bolt 9 and makes it impossible for it to escape from slot 20. Note that shank 17 supports fastening bolt 9 exclusively in the radial direction and there is no relative axial fixation at this point.

Now with reference to FIG. 1, support arm 1 is swung with its tension roll in toward mounting plate 4 so that the other end 5 shown on the left assumes the position indicated in broken lines. In this position, spring 6 with damping element 7 is inserted. The spring supports itself against the projection 27, compresses the end 5 of support arm 1 against a sharply bent limiting projection 24 of mounting plate 4. In this position, it is impossible for support arm to either tilt or shift since it is secured on all sides by way of ball bearing 8 and fastening bolt 9.

In order to facilitate installation of the tensioning device, spring 6 can be pretensioned by introducing a wedge-shaped insert 15 with a locking projection between the limiting projection 24 and the corresponding end 5 of support arm 1. After installation, this insert can be removed by briefly swinging support arm 1 in the direction designed to increase the tension on spring 6. Sharply bent limiting projection 24 and an additional bent reinforcing edge 26 secure mounting plate 4 against twisting and elastic bending. In the area of support projection 27 for spring 6, mounting plate 4 is attached to the machine block 10 by additional screw 28 and a slot 29. This provides a degree of adjustment.

SUMMARY

A tensioning device consists of a support arm 1 with a tensioning roll 2 attached by way of a pivot bearing 8 directly to a machine block 10 and supported thereon. The same fastening bolt 9 clamps a mounting plate 4, on which support arm 1 is braced by way of a spring in the pivoting direction. So that the tensioning device forms a pre-mounted unit before installation, shank sections 17, 19, which project from mounting plate 4, hold pivot bearing 8 on both sides by way of fastening bolt 8. The alignment of the various parts with respect to each other is the same as when they are in their operating positions after installation.

What is claimed is:

1. Tensioning mechanism for drive belts, consisting of a support arm (1), a rotating tensioning roll (2) mounted on the arm, a pivot bearing (8) on the support arm (1) a certain distance away from said tensioning roll and which is attached, together with a mounting plate (4) by means of a fastener (9) to a machine block (10), biasing means (6) operable to urge the tensioning roll (2) away from the mounting plate (4) and toward the drive belt (3), wherein, in the area of the pivot bearing (8), the mounting plate (4) has, in an axial direction of the bearing, a fork-shaped cross section with shank sections (17,19) which support the pivot bearing (8) on both siees, radially and axially, by way of the fastener (9).

2. Tensioning mechanism according to claim 1, wherein the shank section (17) facing away from the mounting plate (4) is guided ont he fastener (9) exclusively in the radial direction by a receiving bore (16).

3. Tensioning mechanism according to claim 1, wherein the inner races of the pivot bearing, which is designed as a roller bearing (8), are machined into the fastener (9).

4. Tensioning mechanism according to claim 1, wherein the shank section (17) has a continuous radial insertion slot (23) for the fastener (9), which proceeds from the receiving bore (16) and extends essentially in the direction opposite to the tensioning direction of the spring (6).

5. Tensioning mechanism according to claim 1, wherein the receiving bore (16,12) has a diameter which is larger than that of the fastener (9) and that an axially self-retaining guide ring (20,13) is inserted into the annular intermediate space.

6. Tensioning mechanism according to claim 1, wherein the mounting plate (4) is designed with integral shank sections (17,19), and in that the transition areas between the shank sections (17,19) and a support projection (27) for the spring (6) and the damping element (7), which areas are especially susceptible to bending stress, have reinforcing edges (326) bent out of the plane.

7. Tensioning meahcnism according to claim 1, wherein the mounting plate (4) has a projection (24), which limits the swing of the support arm (1) in the tensioning direction of the spring (6).

8. Tensioning mechanism according to claim 1, including a swing-limiting projection connected to the mounting plate which limits the swing of the support arm in the tensioning direction of the spring and a removable insert 25 for pretensioning the tensioning device to secure the device during transport and mounting.

9. Tensioning mechanism according to claim 1, wherein the pivot bearing 8 is mounted on the support arm between the spring 6 and the tensioning roll 2.

* * * * *